US008363682B2

(12) United States Patent
He

(10) Patent No.: US 8,363,682 B2
(45) Date of Patent: Jan. 29, 2013

(54) PSEUDO NOISE CODE TRACKING CIRCUIT AND PSEUDO NOISE CODE TRACKING METHOD

(75) Inventor: Wei-Hung He, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 498 days.

(21) Appl. No.: 12/616,136

(22) Filed: Nov. 10, 2009

(65) Prior Publication Data

US 2010/0124242 A1 May 20, 2010

(30) Foreign Application Priority Data

Nov. 17, 2008 (TW) ............................... 97144347 A

(51) Int. Cl.
*H04J 3/06* (2006.01)

(52) U.S. Cl. ....................................................... 370/515

(58) Field of Classification Search ................... 370/515
See application file for complete search history.

(56) References Cited

U.S. PATENT DOCUMENTS 6,256,335 B1 * 7/2001 Hendrickson ................ 375/136
2001/0004377 A1 * 6/2001 Lee et al. ...................... 375/141

FOREIGN PATENT DOCUMENTS

CN 1677909 A 10/2005

* cited by examiner

*Primary Examiner* — Jason Mattis
*Assistant Examiner* — Stephen J Clawson
(74) *Attorney, Agent, or Firm* — McClure, Qualey & Rodack, LLP

(57) ABSTRACT

A pseudo noise code (PN code) tracking circuit includes a first correlator, a storage device, a second correlator and a detector. The first correlator is utilized for performing correlation on a first PN code in a first signal frame with a local PN code to generate a first set of correlation values, and for performing correlation on a second PN code in a second signal frame with the local PN code to generate a second set of correlation values. The storage device is coupled to the first correlator for storing the first and second sets of correlation values. The second correlator is coupled to the storage device for performing correlation on the first set of correlation values with the second set of correlation values to generate a shift value. The detector is coupled to the second correlator for generating a frame number according to the shift value.

13 Claims, 2 Drawing Sheets

100

110
Pseudo noise code generator

C

120
F1/F2 → First correlator → R1/R2

130
Storage device

R1/R2

140
Second correlator → SV

150
Detector → FN

PSEUDO NOISE CODE TRACKING CIRCUIT AND PSEUDO NOISE CODE TRACKING METHOD

BACKGROUND OF THE INVENTION

1. Field of the Invention

The present invention relates to a tracking circuit and a related method thereof, and more particularly, to a pseudo noise code tracking circuit and a pseudo noise code tracking method.

2. Description of the Prior Art

In time domain synchronous orthogonal frequency division multiplexing (TDS OFDM) systems, a receiver needs to perform code acquisition to detect a pseudo noise code (PN code) in a received signal thereof for being synchronized with a transmitter. In prior art, the receiver performs correlation on PN codes in two successive frames of the received signal respectively with a PN code generated by the receiver to thereby generate two sets of correlation values, and then detects the PN code in the received signal according to the peak position of the two sets of correlation values.

However, when the noise induced by the channel does not belong to additive white Gaussian noise, the reliability of the SN code detected only according to the peak position of the correlation values is not high. For example, in the signal frequency network (SFN), the frames to which peak values in two consecutive sets of correlation values correspond may come from different paths, and it will cause the receiver to have a miscarriage of the PN code detection. To raise the detection accuracy of the PN code, the correlation has to be performed with a higher sampling rate, but that will cause burden to the circuit because of a significant increase in computational load.

SUMMARY OF THE INVENTION

Therefore, one of the objectives of the present invention is to provide a pseudo noise code (PN code) tracking circuit and a related method thereof, wherein the PN code tracking circuit performs correlation upon a received signal twice through a first correlator, a storage device, a second correlator and a detector for generating a frame number, to solve the above-mentioned problem.

According to an aspect of the claimed invention, a PN code tracking circuit is disclosed. The PN code tracking circuit includes a first correlator, a storage device, a second correlator and a detector. The first correlator is utilized for performing correlation on a first PN code in a first signal frame with a local PN code to generate a first set of correlation values, and for performing correlation on a second PN code in a second signal frame with the local PN code to generate a second set of correlation values. The storage device is coupled to the first correlator for storing the first and the second sets of correlation values. The second correlator is coupled to the storage device for performing correlation on the first set of correlation values with the second set of correlation values to generate a shift value. The detector is coupled to the second correlator for generating a frame number according to the shift value.

According to another aspect of the claimed invention, a PN code tracking method is disclosed. The PN code tracking method comprises the steps of: performing correlation on a first PN code in a first signal frame with a local PN code to generate a first set of correlation values, and performing correlation on a second PN code in a second signal frame with the local PN code to generate a second set of correlation values; storing the first and second sets of correlation values; performing correlation on the first set of correlation values with the second set of correlation values to generate a shift value; and generating a frame number according to the shift values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
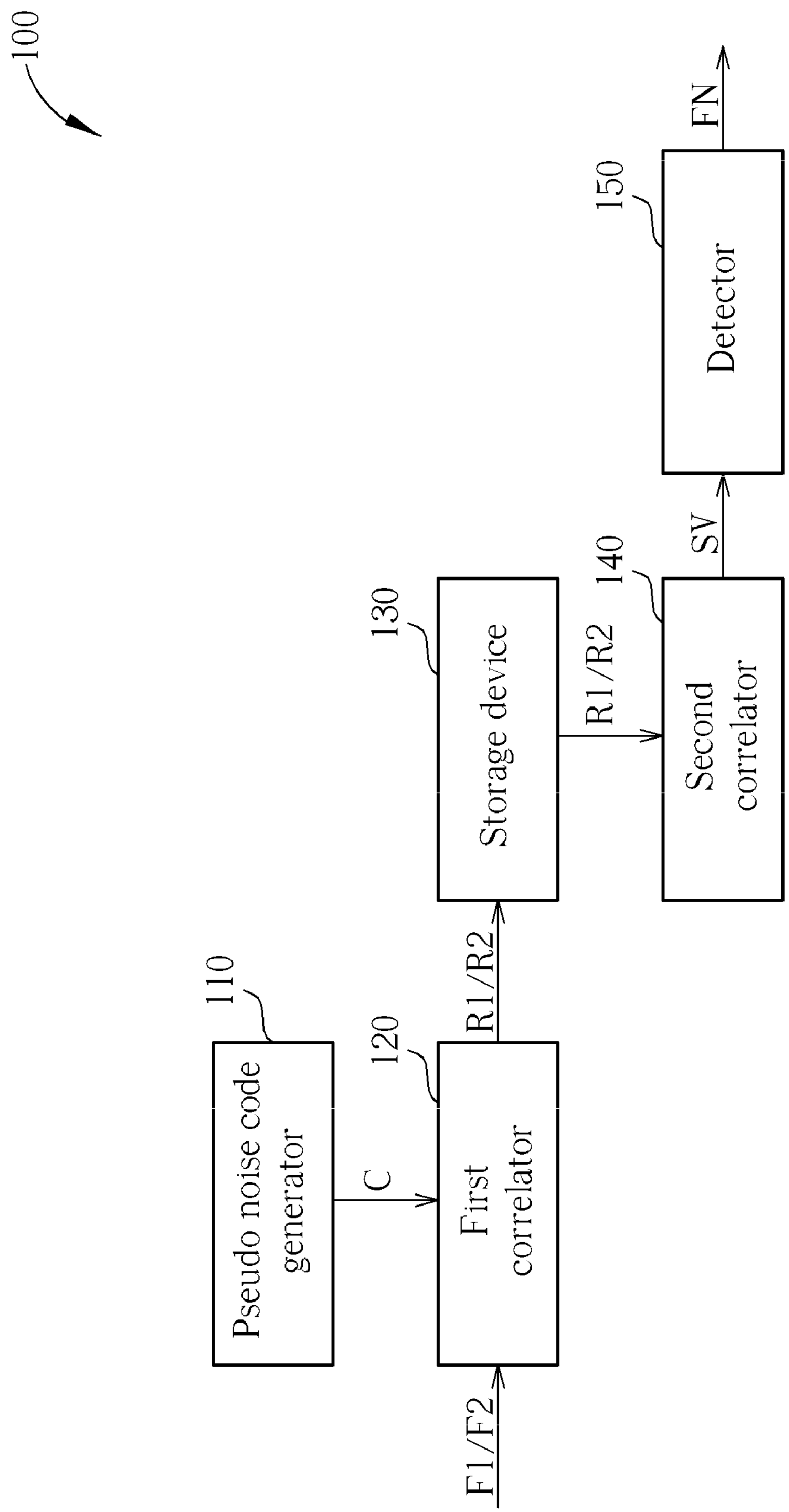
FIG. 1 is a block diagram of a pseudo noise code tracking circuit according to the present invention.

Please refer to FIG. 1. FIG. 1 is a block diagram of a pseudo noise code (PN code) tracking circuit 100 according to the present invention. As shown in FIG. 1, the PN code tracking circuit 100 includes a PN code generator 110, a first correlator 120, a storage device 130, a second correlator 140 and a detector 150. The PN code tracking circuit 100 is used for generating a local PN code C. The first correlator 120 is coupled to the PN code tracking circuit 100 for performing correlation on a first PN code in a first signal frame F1 with the local PN code C to generate a first set of correlation values R1 and for performing correlation on a second PN code in a second signal frame F2 with the local PN code C to generate a second set of correlation values R2. The storage device 130 is coupled to the first correlator 120 for storing the first and the second sets of correlation values R1, R2. The second correlator 140 is coupled to the storage device 130 for performing correlation on the first set of correlation values R1 with the second set of correlation values R2 to generate a shift value SV. The detector 150 is coupled to the second correlator 140 for generating a frame number FN according to the shift value SV. The following will use an embodiment to further illustrate details of the PN code tracking circuit of the present invention; however, this is only for illustrative purposes, and is not meant to be a limitation of the present invention.

Figure 2:
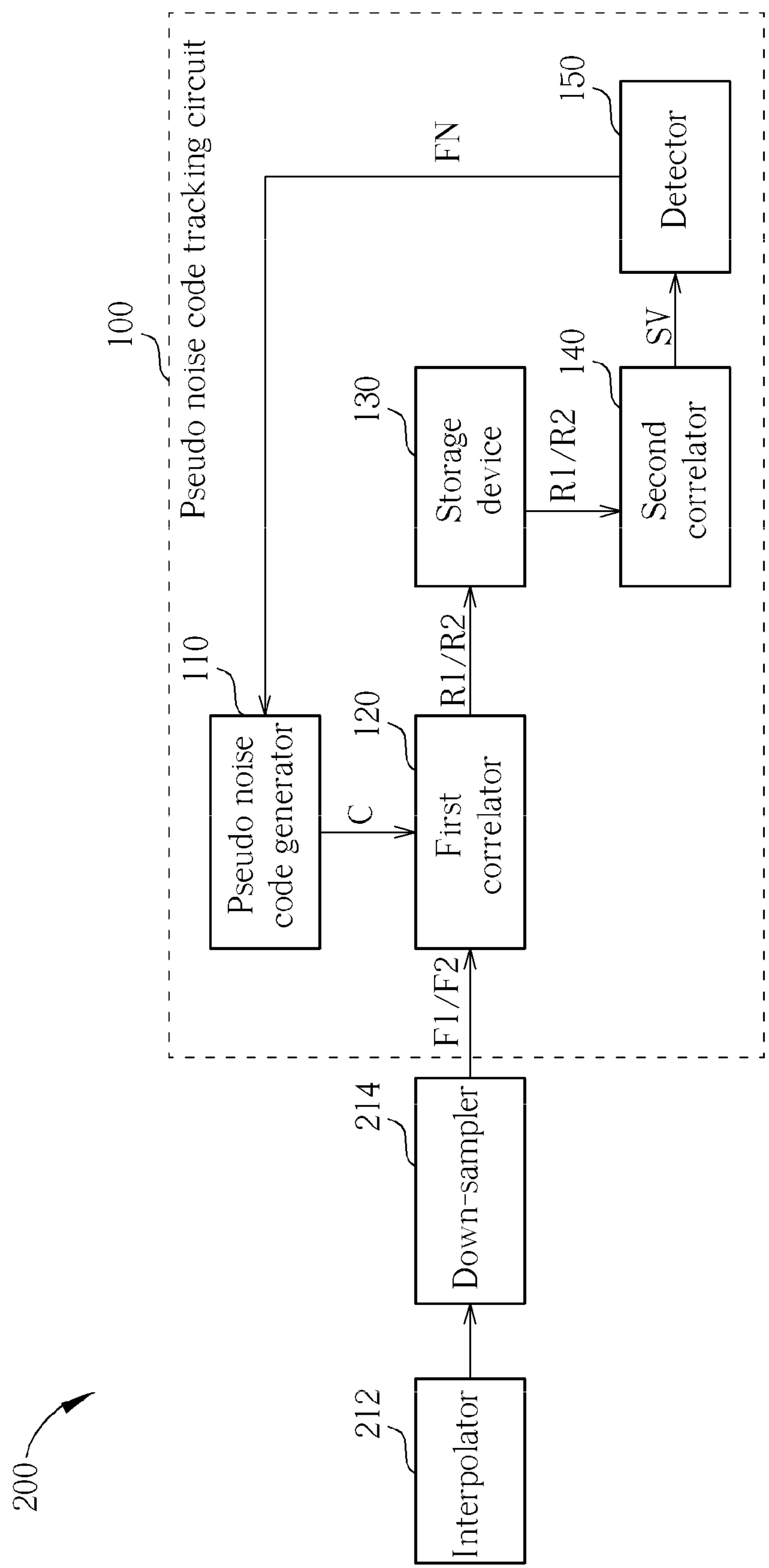
FIG. 2 is a diagram illustrating a pseudo noise code tracking circuit disposed in a receiver according to an embodiment of the present invention.

Please refer to FIG. 2. FIG. 2 is a diagram illustrating a PN code tracking circuit disposed in a receiver 200 according to an embodiment of the present invention. The receiver 200 includes, but is not limited to, an interpolator 212, a down-sampler 214 and the PN code tracking circuit 100. In this embodiment, the receiver 200 is a receiver employed in the TDS OFDM system, and the signal received by the receiver 200 is composed of a plurality of frames with frame numbers in order. Each frame has a PN code corresponding to one frame number thereof. The operational scenarios of the receiver 200 are illustrated as follows.

The signal received by the receiver 200 first undergoes interpolation and down-sampling through the interpolator 212 and the down-sampler 214, and is then fed into the PN code tracking circuit 100. Because the operation of the interpolator 212 and the down-sampler 214 is well known to those skilled in the art, a detailed description is omitted here for the sake of brevity. In the PN code tracking circuit 100, the first correlator 120 performs correlation on a PN code in a signal frame F1 and a PN code in another signal frame F2 of the input signal first. The correlation can be represented using the following equation (1):

$$R(k,m)=\frac{1}{K}\sum_{n=0}^{K-1}r(n)\cdot C^*(n-k-m) \tag{1}$$

In equation (1), r is a PN code, C is a local PN code generated by the PN code generator 110, R is a correlation value, k is a correlation value generation number, and m is a predetermined constant value. Taking m=0, k=0-199 as an example, the correlator 120 performs correlation as specified in equation (1) on a PN code $r_1(n)$ in the signal frame F1 to generate a set of correlation values R1, which contain 200 correlation values R1(0,0), R1(1,0), R1(2,0), . . . , R1(199,0), and then generates the set of correlation values R1 to the storage device 130 for storing the set of correlation values R1 in the storage device 130; Similarly, the first correlator 120 performs correlation specified in equation (1) on a PN code $r_2(n)$ in the signal frame F2 to generate a set of correlation values R2, which contain 200 correlation values R2(0,0), R2(1,0), R2(2,0), . . . , R2(199,0), and then generates the set of correlation values R2 to the storage device 130 for storing the set of correlation values R2 in the storage device 130.

Next, the second correlator 140 performs circular correlation on two sets of correlation values R1, R2 which are stored in the storage device 130. The circular correlation can be represented using the following equation (2):

$$\mathrm{Corr}(i)=\sum_{n=0}^{L-1}|R_1(n,m)|\cdot|R_2((n-i)\mathrm{mod}L,m)| \tag{2}$$

In equation (2), Corr is a correlation value, and i is a shift pointer. Taking i=0-199 and L=200 as an example, the second correlator 140 performs circular correlation specified in equation (2) on R1, R2 to generate a plurality of correlation values Corr(0), Corr(1), Corr(2), . . . , Corr(199), and generate a shift point corresponding to a correlation value with the peak value among the correlation values to serve as a shift value. That is, the second correlator 140 outputs a shift pointer of a maximum correlation value among the correlation values to be a shift value SV. For example, if the correlation value Corr(25) is the peak correlation value of the correlation values, the second correlator 140 will choose the shift pointer 25 of the correlation value Corr(25) as a shift value SV delivered to the following detector 150.

Generally speaking, the SN codes corresponding to different frame numbers have different phases. In other words, there will be a phase shift between PN codes corresponding to two frame numbers. Therefore, the frame number of a frame can be determined according to the phase shift value. This technique is called code acquisition. Since this technology is well known to those skilled in the art and is not a key point of the present invention, further description is not detailed here for brevity. As mentioned above, the detector 150 finds a frame number FN corresponding to the frame F1 according to the shift value SV generated by the second correlator 140, and then generates the frame number FN to the PN code generator 110. Therefore, the PN code generator 110 can refresh the local PN code C according to the frame number FN. For example, the detector 150 finds a frame number 16 corresponding to the frame F1 according to the shift value 25, and generates the frame number 16 to the PN code generator 110. Therefore, the PN code generator 110 can generate the PN code corresponding to the frame number 16 (i.e., the PN code corresponding to the frame F1), and can generate the PN codes corresponding to the following frame numbers (e.g., 17, 18, 19, etc.) to the first correlator 120 sequentially, for achieving the objective of tracking the received signal.

Please note that, in the above-mentioned embodiment, the detector 150 finds a frame number corresponding to the frame F1 only according to a single shift value. However, this is merely for illustrative purposes, and is not meant to be a limitation of the present invention. In practice, the detector 150 can find the frame number corresponding to the frame F1 via a plurality of shift values corresponding to frame F1 and other frames (e.g., F3, F4, etc). Since those skilled in the art can readily understand how the first correlator 120, the storage device 130, and the second correlator 140 work for finding the frame number corresponding to the frame F1 via a plurality of shift values of frame F1 and other frames (e.g., F3, F4, etc) after reading the above-mentioned description, further description is omitted here for the sake of brevity.

According to the above-mentioned description, the PN code tracking method performed by the PN code tracking circuit 100 of the present invention can be briefly summarized as below: performing correlation on a first PN code in a first signal frame with a local PN code to generate a first set of correlation values; performing correlation on a second PN code in a second signal frame with the local PN code to generate a second set of correlation values; storing the first and second sets of correlation values; performing correlation on the first set of correlation values with the second set of correlation values to generate a shift value; generating a frame number according to the shift values; generating the local PN code; and, after the frame number is determined, updating the local PN code according to the frame number. In addition, in the PN code tracking method of the present invention, the first and second sets of correlation values are derived using the above-mentioned equation (1), and the shift values are derived using the above-mentioned equation (2). Because the details directed to the correlation procedure of the equation (1) and equation (2) have been disclosed in the description of the operation of the PN code tracking circuit 100, they are not repeated here for brevity.

Those skilled in the art will readily observe that numerous modifications and alterations of the device and method may be made while retaining the teachings of the invention.

What is claimed is:

1. A pseudo noise code (PN code) tracking circuit, comprising:

a first correlator, for performing correlation on a first PN code in a first signal frame with a local PN code to generate a first set of correlation values, and performing correlation on a second PN code in a second signal frame with the local PN code to generate a second set of correlation values;

a storage device, coupled to the first correlator, for storing the first and the second sets of correlation values; and a second correlator, coupled to the storage device, for performing correlation on the first set of correlation values with the second set of correlation values to generate a shift value; and a detector, coupled to the second correlator, for generating a frame number according to the shift value.

2. The circuit of claim 1, wherein the second correlator performs correlation on the first set of correlation values with the second set of correlation values to generate a plurality of correlation values.

3. The circuit of claim 2, wherein the second correlator refers to a plurality of shift pointers for performing correlation on the first and the second sets of correlation values to generate the plurality of correlation values, and outputting a shift pointer corresponding to a maximum correlation value of the plurality of correlation values as the shift value.

4. The circuit of claim 1, wherein the second correlator derives absolute values of the first and the second sets of correlation values, and then performs correlation on the absolute values.

5. The circuit of claim 1, wherein the correlation performed on the first and the second sets of correlation values by the second correlator is a circular correlation.

6. The circuit of claim 1, further comprising:

a PN code generator, coupled to the first correlator and the detector, for generating the local PN code, and for updating the local PN code according to the frame number after the frame number is determined by the detector.

7. A pseudo noise code (PN code) tracking method executed by a tracking circuit, comprising:

performing correlation on a first PN code in a first signal frame with a local PN code to generate a first set of correlation values;

performing correlation on a second PN code in a second signal frame with the local PN code to generate a second set of correlation values;

storing the first and the second sets of correlation values;

performing correlation on the first set of correlation values with the second set of correlation values to generate a shift value; and generating a frame number according to the shift value.

8. The method of claim 7, wherein performing correlation on the first set of correlation values with the second set of correlation values comprises:

performing correlation on the first and the second sets of correlation values to generate a plurality of correlation values.

9. The method of claim 8, wherein performing correlation on the first set of correlation values with the second set of correlation values further comprises:

referring to a plurality of shift pointers for performing correlation on the first and the second sets of correlation values to generate the plurality of correlation values.

10. The method of claim 9, wherein performing correlation on the first set of correlation values with the second set of correlation values further comprises:

outputting a shift pointer corresponding to a maximum correlation value of the plurality of correlation values as the shift value.

11. The method of claim 7, wherein performing correlation on the first set of correlation values with the second set of correlation values comprises:

deriving absolute values of the first and the second sets of correlation values, and then performing correlation on the absolute values.

12. The method of claim 7, wherein the correlation performed on the first and the second sets of correlation values is a circular correlation.

13. The method of claim 7, further comprising:

generating the local PN code; and updating the local PN code according to the frame number after the frame number is determined.

* * * * *